United States Patent
Sun et al.

(10) Patent No.: US 12,492,397 B2
(45) Date of Patent: Dec. 9, 2025

(54) ENGINEERED sgRNA DESIGN AND PREPARATION METHOD

(71) Applicant: uBriGene (MA) Biosciences Inc., Dover, DE (US)

(72) Inventors: Xiulian Sun, Jiangsu (CN); Sheng Zhao, Jiangsu (CN); Xiangyang Zhang, Jiangsu (CN)

(73) Assignee: uBriGene (MA) Biosciences Inc., Dover, DE (US)

( * ) Notice: Subject to any disclaimer, the term of this patent is extended or adjusted under 35 U.S.C. 154(b) by 0 days.

(21) Appl. No.: 18/830,722

(22) Filed: Sep. 11, 2024

(65) Prior Publication Data
US 2025/0002906 A1 Jan. 2, 2025

Related U.S. Application Data

(63) Continuation of application No. PCT/CN2023/098054, filed on Jun. 2, 2023.

(51) Int. Cl.
| | |
|---|---|
| *C12N 15/11* | (2006.01) |
| *C12N 9/22* | (2006.01) |
| *C12N 15/90* | (2006.01) |
| *C12P 19/34* | (2006.01) |

(52) U.S. Cl.
CPC .............. *C12N 15/11* (2013.01); *C12N 9/22* (2013.01); *C12N 15/907* (2013.01); *C12P 19/34* (2013.01); *C12N 2310/20* (2017.05)

(58) Field of Classification Search
CPC ........ C12N 15/11; C12N 9/22; C12N 15/907; C12N 2310/20; C12N 15/113; C12N 15/63; C12P 19/34
See application file for complete search history.

(56) References Cited

U.S. PATENT DOCUMENTS

| | | | |
|---|---|---|---|
| 2014/0273226 A1 | 9/2014 | Wu | |
| 2021/0238608 A1 | 8/2021 | Pedersen et al. | |
| 2022/0047637 A1* | 2/2022 | Aupepin De Lamothe-Dreuzy | A61K 35/28 |

FOREIGN PATENT DOCUMENTS

| | | | |
|---|---|---|---|
| CN | 108384787 A | 8/2018 | |
| CN | 112513273 A | 3/2021 | |
| WO | WO-2022192863 A1 * | 9/2022 | C07K 14/005 |

OTHER PUBLICATIONS

Park (Journal of microbiology and biotechnology 10.2 (2000): 264-266) (Year: 2000).*
Liu (Nature communications 10.1 (2019): 5292) (Year: 2019).*
International Search Report and Written Opinion mailed Feb. 29, 2024 in corresponding International Application No. PCT/CN2023/098054 (19 pages).
Xie, Chen, "Construction and Application of MiRNA and RISC-mediated sgRNA Expression System", China Academic Journal Electronic Publishing House, Dec. 15, 2018, A006-105 (116 pages)(with English abstract).
Mu et al., "5' capped and 3' polyA-tailed sgRNAs enhance the efficiency of CRISPR-Cas9 system", Protein & Cell, vol. 10, No. 3, Mar. 31, 2019 (6 pages).

* cited by examiner

*Primary Examiner* — Anne M. Gussow
*Assistant Examiner* — Kyle T Rega
(74) *Attorney, Agent, or Firm* — Rothwell, Figg, Ernst & Manbeck, P.C.

(57) ABSTRACT

The present invention provides a DNA-targeting RNA comprising a single-guide RNA (sgRNA) and a ribonucleotide sequence rich in adenine ribonucleotide, and its use in gene editing, and a method for improving the efficiency of sgRNA-mediated gene editing, comprising a step of adding a ribonucleotide sequence rich in adenine ribonucleotide at 3' end of the sgRNA.

17 Claims, 4 Drawing Sheets
Specification includes a Sequence Listing.

SEQUENCE LISTING

Sequence total quantity: 21

```
SEQ ID NO: 1              moltype = RNA   length = 101
FEATURE                   Location/Qualifiers
source                    1..101
                          mol_type = other RNA
                          organism = synthetic construct
SEQUENCE: 1
gcttgacgca tcgcgccagg agttttagag ctagaaatag caagttaaaa taaggctagt    60
ccgttatcaa cttgaaaaag tggcaccgag tcggtgcttt t                       101

SEQ ID NO: 2              moltype = RNA   length = 126
FEATURE                   Location/Qualifiers
source                    1..126
                          mol_type = other RNA
                          organism = synthetic construct
SEQUENCE: 2
gcttgacgca tcgcgccagg agttttagag ctagaaatag caagttaaaa taaggctagt    60
ccgttatcaa cttgaaaaag tggcaccgag tcggtgcttt tatacaacaa aaacaaaaac   120
aagaaa                                                              126

SEQ ID NO: 3              moltype = RNA   length = 101
FEATURE                   Location/Qualifiers
source                    1..101
                          mol_type = other RNA
                          organism = synthetic construct
modified_base             1
                          mod_base = OTHER
                          mod_base = gm
                          note = phosphothionate
modified_base             2
                          mod_base = cm
                          mod_base = OTHER
                          note = phosphothionate
modified_base             3
                          mod_base = OTHER
                          mod_base = um
                          note = phosphothionate
modified_base             99
                          mod_base = OTHER
                          mod_base = um
                          note = phosphothionate
modified_base             100
                          mod_base = OTHER
                          mod_base = um
                          note = phosphothionate
modified_base             101
                          mod_base = um
                          mod_base = OTHER
                          note = phosphothionate
SEQUENCE: 3
gcttgacgca tcgcgccagg agttttagag ctagaaatag caagttaaaa taaggctagt    60
ccgttatcaa cttgaaaaag tggcaccgag tcggtgcttt t                       101

SEQ ID NO: 4              moltype = DNA   length = 61
FEATURE                   Location/Qualifiers
source                    1..61
                          mol_type = other DNA
                          organism = synthetic construct
SEQUENCE: 4
ctcttaatac gactcactat agcttgacgc atcgcgccag gagttttaga gctagaaata    60
g                                                                    61

SEQ ID NO: 5              moltype = DNA   length = 59
```

-continued

```
FEATURE                 Location/Qualifiers
source                  1..59
                        mol_type = other DNA
                        organism = synthetic construct
SEQUENCE: 5
tttcttgttt ttgtttttgt tgtataaaag caccgactcg gtgccactt ttcaagttg    59

SEQ ID NO: 6            moltype = DNA  length = 80
FEATURE                 Location/Qualifiers
source                  1..80
                        mol_type = other DNA
                        organism = synthetic construct
SEQUENCE: 6
aaaagcaccg actcggtgcc acttttcaa gttgataacg gactagcctt attttaactt   60
gctatttcta gctctaaaac                                              80

SEQ ID NO: 7            moltype = DNA  length = 21
FEATURE                 Location/Qualifiers
source                  1..21
                        mol_type = other DNA
                        organism = synthetic construct
SEQUENCE: 7
gcggaaaccg cagaaaaaag t                                            21

SEQ ID NO: 8            moltype = DNA  length = 20
FEATURE                 Location/Qualifiers
source                  1..20
                        mol_type = other DNA
                        organism = synthetic construct
SEQUENCE: 8
tgtaaccagc cacggaactc                                              20

SEQ ID NO: 9            moltype = DNA  length = 21
FEATURE                 Location/Qualifiers
source                  1..21
                        mol_type = other DNA
                        organism = synthetic construct
SEQUENCE: 9
tgggtgatta ccatgtgcca g                                            21

SEQ ID NO: 10           moltype = DNA  length = 21
FEATURE                 Location/Qualifiers
source                  1..21
                        mol_type = other DNA
                        organism = synthetic construct
SEQUENCE: 10
gtagtacacg gcgctgtctt c                                            21

SEQ ID NO: 11           moltype = DNA  length = 21
FEATURE                 Location/Qualifiers
source                  1..21
                        mol_type = other DNA
                        organism = synthetic construct
SEQUENCE: 11
atcagcacaa gcaccgtgct g                                            21

SEQ ID NO: 12           moltype = DNA  length = 21
FEATURE                 Location/Qualifiers
source                  1..21
                        mol_type = other DNA
                        organism = synthetic construct
SEQUENCE: 12
gcgaggcctg ggaatcaaat c                                            21

SEQ ID NO: 13           moltype = RNA  length = 25
FEATURE                 Location/Qualifiers
source                  1..25
                        mol_type = other RNA
                        organism = synthetic construct
SEQUENCE: 13
atacaacaaa aacaaaaaca agaaa                                        25

SEQ ID NO: 14           moltype = RNA  length = 100
FEATURE                 Location/Qualifiers
source                  1..100
                        mol_type = other RNA
                        organism = synthetic construct
```

```
SEQUENCE: 14
ggcaccggca atcccaacga gttttagagc tagaaatagc aagttaaaat aaggctagtc   60
cgttatcaac ttgaaaaagt ggcaccgagt cggtgctttt                        100

SEQ ID NO: 15           moltype = RNA   length = 105
FEATURE                 Location/Qualifiers
source                  1..105
                        mol_type = other RNA
                        organism = synthetic construct
SEQUENCE: 15
ggcaccggca atcccaacga gttttagagc tagaaatagc aagttaaaat aaggctagtc   60
cgttatcaac ttgaaaaagt ggcaccgagt cggtgctttt aacaa                  105

SEQ ID NO: 16           moltype = RNA   length = 110
FEATURE                 Location/Qualifiers
source                  1..110
                        mol_type = other RNA
                        organism = synthetic construct
SEQUENCE: 16
ggcaccggca atcccaacga gttttagagc tagaaatagc aagttaaaat aaggctagtc   60
cgttatcaac ttgaaaaagt ggcaccgagt cggtgctttt acaaaacaa              110

SEQ ID NO: 17           moltype = RNA   length = 115
FEATURE                 Location/Qualifiers
source                  1..115
                        mol_type = other RNA
                        organism = synthetic construct
SEQUENCE: 17
ggcaccggca atcccaacga gttttagagc tagaaatagc aagttaaaat aaggctagtc   60
cgttatcaac ttgaaaaagt ggcaccgagt cggtgctttt agataacaaa aacaa       115

SEQ ID NO: 18           moltype = RNA   length = 120
FEATURE                 Location/Qualifiers
source                  1..120
                        mol_type = other RNA
                        organism = synthetic construct
SEQUENCE: 18
ggcaccggca atcccaacga gttttagagc tagaaatagc aagttaaaat aaggctagtc   60
cgttatcaac ttgaaaaagt ggcaccgagt cggtgctttt aacaaagata acaaaaacaa  120

SEQ ID NO: 19           moltype = RNA   length = 125
FEATURE                 Location/Qualifiers
source                  1..125
                        mol_type = other RNA
                        organism = synthetic construct
SEQUENCE: 19
ggcaccggca atcccaacga gttttagagc tagaaatagc aagttaaaat aaggctagtc   60
cgttatcaac ttgaaaaagt ggcaccgagt cggtgctttt acaaaacaa agataacaaa  120
aacaa                                                              125

SEQ ID NO: 20           moltype = RNA   length = 20
FEATURE                 Location/Qualifiers
source                  1..20
                        mol_type = other RNA
                        organism = synthetic construct
SEQUENCE: 20
aacaaagata acaaaaacaa                                               20

SEQ ID NO: 21           moltype = RNA   length = 25
FEATURE                 Location/Qualifiers
source                  1..25
                        mol_type = other RNA
                        organism = synthetic construct
SEQUENCE: 21
acaaaaacaa agataacaaa aacaa                                         25
```

ENGINEERED sgRNA DESIGN AND PREPARATION METHOD

CROSS REFERENCE TO RELATED APPLICATION

This application is a continuation application of International Application No. PCT/CN2023/098054, filed Jun. 2, 2023, designating the United States, which is incorporated herein by reference in its entirety.

REFERENCE TO SEQUENCE LISTING

This application contains a Sequence Listing, which is hereby incorporated by reference in its entirety. Said Sequence Listing, created on Sep. 5, 2024, is named NP2024TC1508.xml and is 24,697 bytes in size.

TECHNICAL FIELD

The present invention relates to the field of gene editing, in particular to an engineered single-guide RNA (sgRNA).

BACKGROUND ART

A clustered regularly interspaced short palindromic repeats (CRISPR) technology is a two-component gene editing system in which an effector protein induces gene editing with aid of a gene-targeting a single-guide RNA (sgRNA) (Wiedenheft, B. et al. (2012) RNA-guided genetic silencing systems in bacteria and archaea. Nature 482, 331-338). The sgRNA structure includes a CRISPR RNA (crRNA), a trans-activating crRNA (tracrRNA), and a tetraloop, in a length of 97-103 nucleotides (Basila, M. et al. (2017) Minimal 2'-O-methyl phosphorothioatelinkage modification pattern of synthetic guide RNAs for increased stability and efficient CRISPR-Cas9 gene editing avoiding cellular toxicity. PLoS One 12, e0188593).

sgRNA can be produced by chemical synthesis (Wang, W. et al. (2018) Bacteriophage T7 transcription system: an enabling tool in synthetic biology. Biotechnol. Adv. 36, 2129-2137) or in vitro transcription. Chemically synthesis of sgRNA can quickly provide sufficient amount of desired sgRNAs with ensured purity, but it is not technically feasible to chemically synthesize lengthy RNAs, and the length of the chemically synthesized sgRNA (102 nt) is close to the upper limit of sequence fidelity achievable by chemical synthesis processes (Zetsche, B. et al. (2015) Cpf1 is a single RNA-guided endonuclease of a class 2 CRISPR-Cas system. Cell 163, 759-77125).

In vitro transcription can produce Longer sgRNA and is prone to expanded production and high sequence fidelity. However, due to the inability to modify a base or structure during in vitro transcription, sgRNA is unstable and easily degraded by nucleases, resulting in low gene editing efficiency of nucleases guided by sgRNA of the same sequence prepared by in vitro transcription (Hu Z. et al. Customized one-step preparation of sgRNA transcription templates via overlapping PCR Using short primers and its application in vitro and in vivo gene editing[J]. Cell, Bioscience, 2019, 9).

sgRNA can be engineered in a variety of ways, including chemical modifications, changes in spacer length, modifications of spacer or scaffold sequences, modifications of DNA sequences, and replacement of partial RNA sequences with DNA. Chemical modification can only be used in the process of chemical synthesis of sgRNA, and the preparation length of chemical synthesis is limited to 110 nucleotides at most. The change of spacer length can improve the specificity of sgRNA-guided gene editing, but cannot improve the stability and gene editing efficiency of sgRNA. Modification in spacer sequences or scaffold sequences can improve the binding ability of sgRNA to cas9 protease, but cannot improve the stability of sgRNA. The modification and replacement of DNA sequences are technically complex to operate, and the cost of preparing sgRNA is high.

Therefore, it is needed to prepare a large quantity of sgRNA with high efficiency of guiding gene editing by means of in vitro transcription.

SUMMARY OF THE INVENTION

For studies on RNA stability, we first tried to modify 5' and 3' ends of sgRNA using the capping enzyme and the Poly(A) Polymerase, and the results showed that compared with unmodified sgRNA, the sgRNA modified with the capping enzyme and the Poly(A) Polymerase could significantly improve the gene editing efficiency (FIG. 4A, comparison results in Lane 2 and Lane 3; and FIG. 4B, comparison results in Lane 2 and Lane 3). However, due to high cost of the Poly(A) Polymerase and the capping enzyme, and the uncertainty in the number of poly(A) tail sequences, the cost and complexity of the process of producing sgRNA are high, and the uniformity of sgRNA sequences is low.

In a first aspect, the present invention provides a DNA-targeting RNA, comprising a sgRNA and a sequence rich in adenine ribonucleotide (A) located at 3' end and having more than 20 ribonucleotides in length. Preferably, the ribonucleotide sequence rich in adenine ribonucleotide (A) has a length of at least 20 ribonucleotides, wherein the content of A in the ribonucleotide sequence is at least 60%, and more preferably, is selected from the group consisting of SEQ ID NOs: 13, 20 and 21.

In one embodiment, the sgRNA, from 5' to 3' direction, comprises a ribonucleotide sequence specifically targeting a DNA sequence, and a CRISPR effector protein binding moiety. Specifically, the ribonucleotide sequence specifically targeting a DNA sequence has a length of 18-25 ribonucleotides and is preferably 100% complementary to a target sequence in the DNA; and/or, the protein binding moiety comprises two ribonucleotide fragments that are at least partially complementary to each other and hybridized to form a double-stranded RNA (dsRNA) duplex.

In a second aspect, the present invention provides an isolated nucleic acid encoding the DNA-targeting RNA in the first aspect.

In a third aspect, the present invention provides a construct comprising the nucleic acid in the second aspect.

In a fourth aspect, the present invention provides a method for producing the DNA-targeting RNA in the first aspect, comprising: (a) providing a nucleic acid encoding the DNA-targeting RNA, such as the nucleic acid in the second aspect; and (b) in vitro transcripting the nucleic acid to the RNA; and optionally (c) isolating and/or purifying the produced RNA. In particular, the nucleic acid is obtained by PCR amplification.

In a fifth aspect, the present invention provides a method for improving the efficiency of sgRNA-mediated gene editing, comprising: adding a ribonucleotide sequence rich in adenine ribonucleotide (A) at 3' end of sgRNA, the ribonucleotide sequence having a length of at least 20 ribonucleotides, wherein the content of A in the ribonucleotide sequence is at least 60%. In particular, the ribonucleotide sequence rich in adenine ribonucleotide (A) is selected from the group consisting of: SEQ ID NOs: 13, 20 and 21.

In a sixth aspect, the present invention provides a kit, comprising:
- a template primer nucleic acid, comprising a nucleic acid sequence encoding a CRISPR effector protein binding moiety; and
- a first primer, comprising, from 5' to 3' direction, a sequence complementary to the sequence of SEQ ID NO: 13, 20 or 21; and a sequence complementary to partial sequence at 3' end of the template primer nucleic acid; and
- optionally, a second primer, from 5' to 3' direction, encoding a promoter, a sequence corresponding to a ribonucleotide sequence specifically targeting a DNA sequence, and a sequence corresponding to a portion at 5' end of the CRISPR effector protein binding moiety.

In a seventh aspect, the present invention provides a gene editing method, comprising using the DNA-targeting RNA in the first aspect, the nucleic acid in the second aspect, or the construct in the third aspect.

In an eighth aspect, the present invention provides use of the DNA-targeting RNA in the first aspect, the nucleic acid in the second aspect or the construct in the third aspect in gene editing.

BRIEF DESCRIPTION OF THE DRAWINGS

FIG. 4A shows the amplification of a homologously recombined sequence near the left homology arm, wherein the amplified sequence has a size of 1304 bp; FIG. 4B shows the amplification of a homologously recombined sequence near the right homology arm, wherein the amplified sequence has a size of 1321 bp; Line 1 is DNA Marker; Lane 2 is amplified DNA fragments after the homologous recombination guided by the sgRNA (without modification) prepared by in vitro transcription and the cas9 protein; Lane 3 is amplified DNA fragments after the homologous recombination guided by the sgRNA (capped at 5' end and tailed at 3' end) prepared by in vitro transcription and the cas9 protein; Lane 4 is amplified DNA fragments after the homologous recombination guided by the sgRNA (modified with a fixed sequence at 3' end) prepared by in vitro transcription and the cas9 protein; Lane 5 is amplified DNA fragments after the homologous recombination guided by the sgRNA (capped at 5' end and modified with a fixed sequence at 3' end) prepared by in vitro transcription and the cas9 protein; Lane 6 is amplified DNA fragments after the homologous recombination guided by the chemically synthesized sgRNA (the 5' and 3' ends were subjected to 2'-O-methyl modification and phosphorothioate modification) and the cas9 protein; and Lane 7 is amplified DNA fragments after the homologous recombination guided only by chemically synthesized sgRNA (the 5' and 3' ends were subjected to 2'-O-methyl modification and phosphorothioate modification), and this experimental group is a negative control group; and Lane 8 is amplified DNA fragments of non-gene-edited cells, and this experimental group is another negative control group.

DETAILED DESCRIPTION OF THE INVENTION

Figure 1:
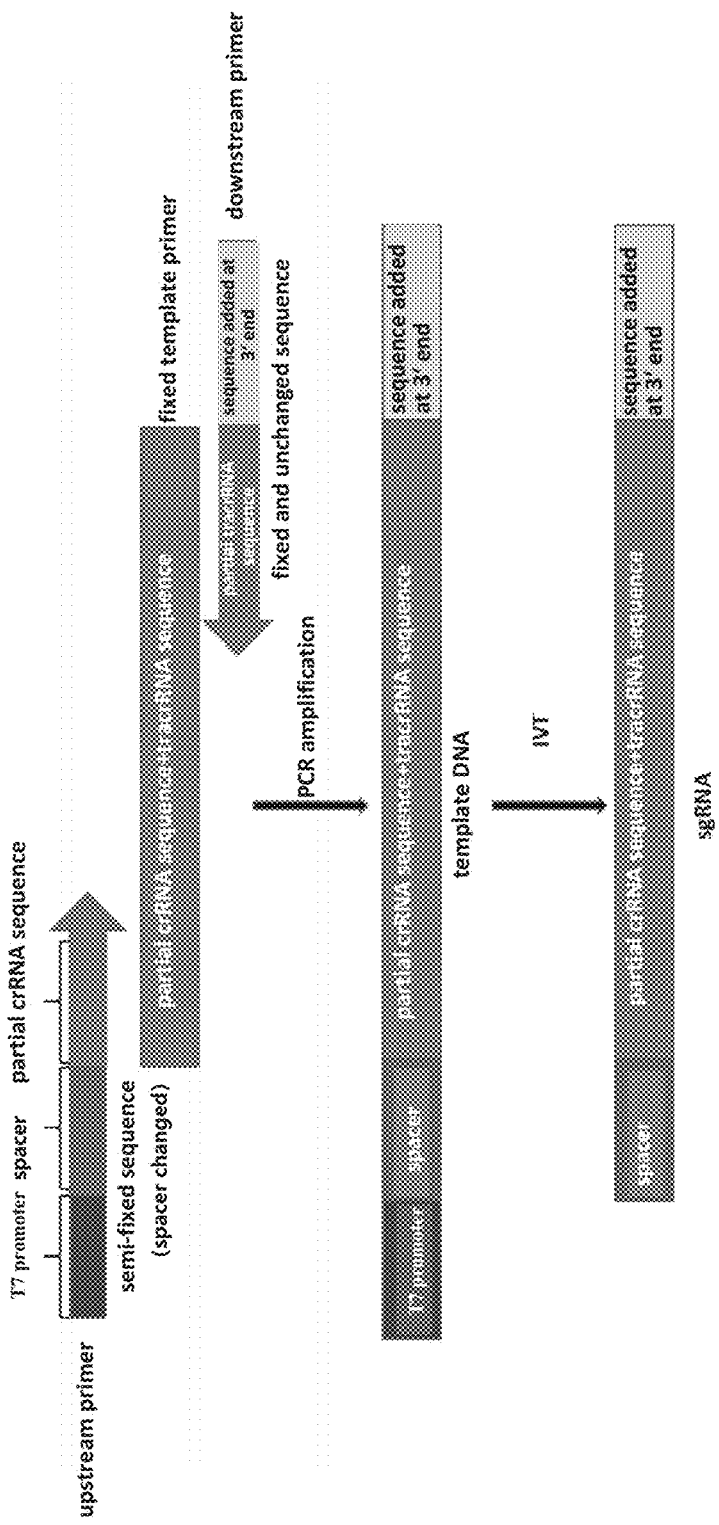
FIG. 1 is a flowchart of sgRNA preparation by a PCR method.

Unless otherwise stated or contextually obvious, the abbreviations used herein have their usual meanings in the fields of chemistry and biology, and all technical and scientific terms used in the present invention have the same meaning as commonly understood by a person of ordinary skill in the art. The experimental methods not specified in the present invention were all done in accordance with specific methods in Molecular Cloning Experimental Guide (Edition 4), J. Sambrook, or in accordance with relevant product instructions. The biological reagents used in the present invention can be obtained commercially unless otherwise specified. A person skilled in the art may make a variety of changes, alterations and substitutions within the scope of not deviating from the spirit of the present invention.

As used herein, the terms "peptide", "polypeptide" and "protein" are used interchangeably and are defined as biomolecules consisting of amino acid residues linked by peptide bonds.

As used herein, the terms "nucleotide sequence", "polynucleotide", "nucleic acid" and "nucleic acid sequence" are used interchangeably and refer to a macromolecule formed by a plurality of nucleotides linked via 3'-5'-phosphodiester bonds, wherein the nucleotides include ribonucleotide and deoxyribonucleotide. Unless otherwise indicated or as determined from the context, nucleic acid as used herein includes, but not limited to, single-stranded, double-stranded or multi-stranded DNA or RNA, genomic DNA, cDNA, a DNA-RNA hybrid, etc.

Unless otherwise stated, a nucleic acid (including DNA and RNA) sequence as used herein is mentioned in 5' to 3' direction from left to right; and an amino acid sequence is mentioned in an amino (N) to carboxyl (C) direction from left (upstream) to right (downstream).

As used herein, the terms "deoxyribonucleic acid sequence", "deoxyribonucleotide sequence", "polydeoxyribonucleotide" and "DNA" are used interchangeably and refer to a deoxyribonucleic acid having a backbone that is a linear or circular polymer formed by linking deoxyribonucleotides (deoxyadenine nucleotide (A), deoxyguanine nucleotide (G), deoxycytosine nucleotide (C), and/or deoxythymine nucleotide (T)) via a 3',5'-phosphodiester bond, comprising single-stranded or double-stranded, linear or circular. DNA may comprise suitable modifications known in the art, such as methylation and thioation.

As used herein, the terms "ribonucleic acid sequence", "ribonucleotide sequence", "polyribonucleotide" and "RNA" are used interchangeably and refer to ribonucleic acid having a backbone that is a linear macromolecule formed by polymerizing ribonucleotides (adenine nucleotide (A), guanine nucleotide (G), cytosine nucleotide (C), and/or uracil nucleotide (U)) via a phosphodiester bond. Unless otherwise stated or determined from the context, the mentioned RNA refers to a single-stranded RNA molecule. The single-stranded RNA molecule may have a partially double-stranded structure (e.g., stem-loop structure), while the RNA molecule, after denaturation, is a single-stranded nucleotide strand.

As used herein, "complementary" refers to a sequence that is capable of being complementary to a given sequence in opposite direction (i.e., 5'-3'/3'-5') in the form of Watson-Crick base pairings, i.e., A-T/A-U or G-C, thus forming a double strand, e.g., 5'-ATGC-3' and 5'-GCAT-3' are complementary sequences to each other. The length of the complementary sequence used herein may be any suitable length, preferably 10-30 nucleotides, more preferably 15-30 nucleotides, and more preferably 20-30 nucleotides.

As used herein, the term of DNA sequence "encoding" RNA is a DNA nucleic acid sequence that is transcribed into this RNA. A DNA nucleic acid can encode mRNAs, tRNAs, rRNAs, or RNAs targeting DNA as described here.

As used herein, "gRNA" and "guide RNA" are used interchangeably and refer to an RNA molecule that can form a complex with a CRISPR effector protein and can target the complex to a target sequence due to its certain complementarity with the target sequence. For example, in a Cas9-based gene editing system, gRNA is typically composed of crRNA and tracrRNA molecules that are partially complementary to each other to form a complex, wherein the crRNA comprises a sequence that is sufficiently complementary to the target sequence so as to hybridize to this target sequence and guide the CRISPR complex (Cas9+crRNA+tracrRNA) to bind specifically to this target sequence. It is known in the art that single-guide RNAs (sgRNA) that comprise features of both crRNAs and tracrRNAs can be designed.

As used herein, the terms "single guide gRNA" or "sgRNA" refer to a single RNA molecule that can form a complex with a CRISPR effector protein and can guide the complex to a target sequence due to its nucleotide sequence (a spacer sequence as described herein) containing specific complementary sequence against the target sequence (for example, a specific sequence in a DNA sequence to be edited). For example, sgRNA may include a ribonucleotide sequence that specifically targets a DNA sequence and a CRISPR effector protein binding moiety, the moiety including two sequences that are complementary to each other to form a RNA duplex. Designing appropriate sgRNAs for CRISPR nucleases used and the target sequences to be edited is within the ability of a person skilled in the art, see for example Wang, Y. et al. Simultaneous editing of three homoeoalleles in hexaploid bread wheat confers heritable resistance to powdery mildew. Nat. Biotechnol. 32, 947-951 (2014); Shan, Q. et al. Targeted genome modification of crop plants using a CRISPR-Cas system. *Nat. Biotechnol.* 31, 686-688 (2013); Liang, Z. et al. Targeted mutagenesis in *Zea mays* using TALENs and the CRISPR/Cas system. J Genet Genomics. 41, 63-68 (2014).

As used herein, the term "CRISPR effector protein" generally refers to a nuclease present in a naturally occurring CRISPR system, as well as its modified form, its variants, its catalytically active fragments, etc. The term encompasses any effector protein or its functional variant based on the CRISPR system that enables gene editing within a cell. A CRISPR effector protein can identify, bind, and/or cleave a target nucleic acid structure by interacting with sgRNA. In some embodiments, the CRISPR effector protein and its functional variants have double-stranded cleavage activity, i.e., the ability to form a double-stranded break (DSB) in a target sequence.

The gene editing generally results in the deletion of one or more nucleotides in a target sequence, preferably the deletion of multiple consecutive nucleotides. The type and length of the deletion depend on the location of DSB caused by CRISPR nucleases, as well as the number and locations of cytosine (C) bases present in the target sequence or its complementary sequence. In some embodiments, the length of the deletion does not exceed the length of the target sequence. For example, the deletion may be a deletion of about 1-25 nucleotides, e.g., 10-25 nucleotides, such as 10, 11, 12, 13, 14, 15, 16, 17, 18, 19, 20, 21, 22, 23, 24 or 25 nucleotides.

Examples of "CRISPR effector protein" are, for example, Cas9 nuclease or its active variants (e.g., a protein comprising an active DNA cleavage domain of Cas9 and a gRNA-binding domain of Cas9). "Cas9 nuclease" and "Cas9" are used interchangeably herein and refer to components of a CRISPR/Cas (clustered regularly spaced short palindromic repeats and their associated systems) genome editing system, which can target and cleave a DNA target sequence to form a DNA double-stranded break (DSB) under the guidance of a guide RNA. The Cas9 nuclease may be Cas9 nucleases from different species, such as spCas9 from *Streptococcus pyogenes* (*S. pyogenes*) or SaCas9 derived from *Staphylococcus aureus* (*S. aureus*).

Examples of "CRISPR effector protein" may also include Cpf1 nuclease or variants thereof, which may be derived from different species, e.g., Cpf1 nucleases from *Francisella novicida* U112, *Acidaminococcus* sp. BV31L6 and *Lachnospiraceae bacterium* ND2006.

As used herein, the "target sequence" is a sequence that is complementary to or identical (depending on CRISPR nucleases) with a guide (spacer, i.e. a ribonucleotide sequence that specifically targets a target DNA sequence) sequence of about 20 ribonucleotides comprised in sgRNA. The sgRNA targets the target sequence by pairing with the bases in the target sequence or its complementary strand.

In a first aspect, the present invention provides a DNA-targeting RNA, from 5' to 3' direction, comprising: (i) a single-guide RNA (sgRNA) and (ii) a ribonucleotide sequence rich in adenine ribonucleotide (A), which has at least 20 ribonucleotides in length, wherein the content of A in the ribonucleotide sequence rich in adenine ribonucleotide is at least 60%.

In one embodiment, the ribonucleotide sequence rich in adenine ribonucleotide has 20-30, e.g. 20, 21, 22, 23, 24, 25, 26, 27, 28, 29 or 30, ribonucleotides in length. Preferably, the ribonucleotide sequence rich in adenine ribonucleotide has 20-25, 20-24 or 20-23, e.g., 20, 21, 22, 23 or 24 ribonucleotides in length. In a particularly preferable embodiment, the ribonucleotide sequence rich in adenine ribonucleotide has 20 ribonucleotides in length.

In one embodiment, the content of A in the ribonucleotide sequence rich in adenine ribonucleotide is at least 70%, at least 75%, at least 80%, at least 90%, at least 95% or higher. The content refers to the percentage of the number of adenine ribonucleotides in the ribonucleotide sequence in the total number of ribonucleotides.

In one embodiment, the ribonucleotide sequence rich in adenine ribonucleotide is selected from the group consisting of SEQ ID NOs: 13, 20 and 21. In a particularly preferable embodiment, the ribonucleotide sequence rich in adenine ribonucleotide is shown in SEQ ID NO: 20.

In one embodiment, the 5' end of the ribonucleotide sequence rich in adenine ribonucleotide may be linked to the 3' end of the CRISPR effector protein binding moiety directly or indirectly via any suitable means (e.g., a nucleotide linker) known in the art, as long as the interaction between the CRISPR effector protein binding moiety and the CRISPR effector protein is not significantly affected after linking.

In one embodiment, the nucleotide linker may have about 3-30 nucleotides in length, e.g., about 3-25, 3-20, 3-15, 3-10, 3-5, 5-25, 5-20, 5-15, 5-10, 10-25, 10-25, 10-20, 10-15, 15-25, 15-20, 20-25 nucleotides, such as about 3, 4, 5, 6, 7, 8, 9, 10, 11, 12, 13, 14, 15 nucleotides.

As used herein, the DNA targeted by the RNA may be any DNA to be edited, such as DNA molecules present in unicellular eukaryotes, plant cells, invertebrate cells, or vertebrate cells.

As used herein, the term "sgRNA" refers to any sgRNA known and available in the art. In one embodiment, the sgRNA, from 5' to 3' direction, comprises a ribonucleotide sequence specifically targeting target DNA sequence, and a CRISPR effector protein binding moiety. In one embodiment, the sgRNA, from 5' to 3' direction, comprises a CRISPR RNA (crRNA) and a trans-activating crRNA (tracrRNA).

In one embodiment, the sgRNA herein may have about 80-115, 80-110, 80-105, 80-100, 80-95, 80-90, 85-115, 85-110, 85-105, 85-100, 85-95, 85-90, 90-115, 90-110, 90-105, 90-100, 95-115, 95-110, 95-100, e.g. about 80-115 ribonucleotides, such as 90, 91, 92, 93, 94, 95, 96, 97, 98, 99, 100, 101, 102, 103, 104, 105 ribonucleotides in length.

As used herein, the ribonucleotide sequence specifically targeting target DNA sequence refers to a ribonucleotide sequence comprising a ribonucleotide sequence that is complementary to the target DNA sequence. The sgRNA is thus able to interact with the target DNA in a sequence-specific manner through hybridization (i.e., base pairing). According to the target DNA sequence, a person skilled in the art can design a desired specific targeting sequence, so as to achieve a specific interaction with the target DNA.

In one embodiment, the ribonucleotide sequence specifically targeting the target DNA sequence may have about 8-50, e.g. about 8-45, 8-40, 8-35, 8-30, 8-25, 8-20, 8-15, 8-14, 8-13, 8-12, 8-11, 8-10, 9-45, 9-40, 9-35, 9-30, 9-25, 9-20, 9-15, 9-14, 9-13, 9-12, 9-11, 10-45, 10-40, 10-35, 10-30, 10-25, 10-20, 10-15, 10-14, 10-13, 10-12, such as about 8, 9, 10, 11, 12, 13, 14, 15, 16, 17, 18, 19, 20 nucleotides in length. In one embodiment, the ribonucleotide sequence specifically targeting the target DNA sequence may have about 20-23, e.g., 20, 21, 22, or 23 nucleotides in length.

In one embodiment, the ribonucleotide sequence specifically targeting the target DNA sequence refers to a ribonucleotide sequence that is at least partially, preferably completely complementary to the target DNA sequence, so that the target DNA sequence can be specifically targeted. In one embodiment, the ribonucleotide sequence specifically targeting the target DNA sequence may have 18-25, e.g. 18, 19, 20, 21, 22, 23, 24 or 25 ribonucleotides in length.

As used herein, the CRISPR effector protein binding moiety is a ribonucleotide structure capable of forming a complex with the CRISPR effector protein, so that the CRISPR effector protein may be localized to the target DNA sequence under targeting effect of the ribonucleotide that specifically targets the target DNA sequence, thereby allowing subsequent genome editing (as shown in CRISPR technology).

In one embodiment, the CRISPR effector protein binding moiety comprises two ribonucleotide fragments which are at least partially complementary to each other and capable of forming a double-stranded RNA duplex. In one embodiment, the CRISPR effector protein binding moiety comprises at least a portion of crRNA (i.e., a portion other than the ribonucleotide sequence specifically targeting the target DNA sequence) and tracrRNA optionally containing a tetraloop region.

In one embodiment, the crRNA and tracrRNA may be linked via a nucleotide linker and hybridized in partial sequences to form a double-stranded RNA duplex, thus forming a stem-loop structure that is able to interact with a CRISPR effector protein (e.g., Cas9). In one embodiment, the double-stranded RNA duplex may have about 6-50 bp, e.g. about 6-40, 6-30, 6-25, 6-20, 6-15, 8-40, 8-30, 8-25, 8-20 or 8-15 bp, such as about 8-10, 10-15, 15-18, 18-20, 20-25, 25-30, 30-35, 35-40 or 40-50 bp in length.

As used herein, crRNA comprises ribonucleotides that form half of the dsRNA duplex, and tracrRNA comprises ribonucleotides that forms the other half of the dsRNA duplex. Therefore, the crRNA and tracrRNA are complementary to each other and hybridized to form the dsRNA duplex of the CRISPR effector protein binding moiety.

Various crRNAs and tracrRNAs are known or available in the art. For example, various crRNAs and tracrRNAs can be seen in e.g. FIG. 8 of CN107603976B in the form of corresponding complementary pairs. The sgRNA described herein may comprise any corresponding crRNA and tracrRNA pair.

In one embodiment, the protein binding moiety may have about 8-100 ribonucleotides in length. For example, the protein binding moiety may have about 10-100, 10-90, 10-80, 10-70, 10-60, 10-50, 10-40, 10-30, 10-20, 15-100, 15-90, 15-80, 15-70, 15-60, 15-50, 15-40, 15-30, 15-20, 20-100, 20-90, 20-80, 20-70, 20-60, 20-50, 20-40, 20-30, 20-25, 25-100, 25-90, 25-80, 25-70, 25-60, 25-50, 25-40, 25-30, e.g. 10, 15, 20, 25, 30, 35, 40 ribonucleotides in length.

In some embodiments, the CRISPR effector protein is a nuclease selected from the group consisting of Cas3, Cas8a, Cas5, Cas8b, Cas8c, Cas10d, Cse1, Cse2, Csy1, Csy2, Csy3, GSU0054, Cas10, Csm2, Cmr5, Cas10, Csx11, Csx10, Csf1, Cas9, Csn2, Cas4, Cpf1, C2c1, C2c3 and C2c2, or functional variants thereof.

The inventors have found that after the 3' end of the CRISPR effector protein binding moiety is linked to a ribonucleic acid sequence comprising SEQ ID NO: 13, 20 or 21, the genome editing efficiency and target specificity are improved, and efficient and safe gene editing can be realized. The 5' end of the ribonucleic acid sequence of SEQ ID NO: 13, 20 or 21 may be linked to the 3' end of the CRISPR effector protein binding moiety directly or indirectly via any suitable means e.g. a nucleotide linker known in the art, as long as the interaction between the protein binding moiety and a site-specific modified polypeptide is not significantly affected after linking.

In a second aspect, the present invention provides an isolated nucleic acid encoding the RNA in the first aspect.

In particular, the nucleic acid is a DNA molecule capable of producing the RNA after transcription. In one embodiment, the nucleic acid comprises a polynucleotide that codes the promoter, sgRNA and ribonucleotide sequence rich in adenine ribonucleotide as described above.

In a third aspect, the present invention provides a construct which comprises the nucleic acid in the second aspect.

In addition, the construct includes a vector, e.g., an expression vector. The construct includes elements required for transcription and/or translation, such as a promoter, an enhancer, a transcription terminator and so on, whereby RNA can be obtained by transcription. A variety of suitable expression vectors are known and available in the art.

As described herein, the promoter may be any suitable promoter, especially a eukaryotic promoter, such as but not limited to a T7 promoter, a CMV immediate early promoter, and a SV40 promoter. In one embodiment, the T7 promoter comprises a sequence of nucleotides 1-21 in SEQ ID NO: 4.

In a fourth aspect, the present invention provides a method for producing the RNA in the first aspect, comprising: (a) providing a nucleic acid that encodes the RNA; and (b) performing in vitro transcription on the nucleic acid to produce RNA; and optionally (c) isolating and/or purifying the produced RNA.

The nucleic acid that encodes the RNA can be provided by any suitable method, such as chemical synthesis or biological expression, or amplification e.g. PCR. The nucleic acid may be RNA or DNA, preferably DNA.

As used herein, in vitro transcription refers to a process of synthesizing RNA from target DNA using a transcription reagent (e.g., RNA polymerase) and other required ions or compounds in a non-viable cell or extracellular environment.

RNA isolation and purification are well known to a person skilled in the art and can be performed by any suitable method.

In one embodiment, the present invention provides a method for producing the RNA in the first aspect, comprising:
(i) providing a template primer nucleic acid comprising a CRISPR effector protein binding moiety as described herein;
(ii) providing an upstream primer and a downstream primer, wherein the downstream primer, from 5' to 3' direction, comprises a sequence complementary to the sequence of SEQ ID NO: 13, 20, or 21, and a sequence complementary to a partial sequence at 3' end of the template primer nucleic acid; and the upstream primer comprises a nucleotide sequence corresponding to a ribonucleotide sequence specifically targeting a target DNA sequence, and a partial sequence at 5' end of the template primer nucleic acid;
(iii) performing PCR amplification to obtain a template nucleic acid, preferably template DNA;
(iv) performing in vitro transcription on the template nucleic acid to obtain RNA; and
(v) optionally, isolating and purifying the obtained RNA.

In one embodiment, the upstream primer comprises a promoter sequence, a nucleotide sequence corresponding to a nucleotide sequence that specifically targets the target DNA sequence, and a partial sequence at 5' end of the template primer nucleic acid.

As used herein, "partial sequence corresponding to 5' end of the template primer nucleic acid" and "nucleotide sequence corresponding to a ribonucleotide sequence that specifically targets the target DNA sequence" mean that the nucleotide sequence is consistent with the partial sequence at 5' end of the template primer nucleic acid or the ribonucleotide sequence that specifically targets the target DNA sequence, except that T is used in DNA instead of U in RNA.

In one embodiment, the template primer nucleic acid comprises the DNA sequence of SEQ ID NO: 6.

As used herein, the promoter may be any suitable promoter known in the art, such as those that can be used for in vitro transcription, e.g. a T7 RNA polymerase promoter and a T3 RNA polymerase promoter. In one embodiment, the promoter comprises the sequence of nucleotides 1-21 in SEQ ID NO: 4.

As used herein, partial sequence at 5' end of the template primer nucleic acid refers to a sequence of segment located at 5' end of the template primer nucleic acid. Therefore, the primer can be complementary to the antisense strand of the template primer nucleic acid, which is hybridized with the antisense strand after the template primer nucleic acid is annealed, such that the template primer nucleic acid can be amplified by suitable methods such as PCR.

As used herein, a sequence complementary to a partial sequence at 3' end of the template primer nucleic acid refers to a sequence fragment complementary to a sequence located at 3' end of the template primer nucleic acid. Therefore, the primer can be complementary to the sense strand of the template primer nucleic acid, which is hybridized with the sense strand after the template primer nucleic acid is annealed, such that the template primer nucleic acid can be amplified by suitable methods such as PCR.

The partial sequence at 5' or 3' end of the template primer nucleic acid or its complementary sequence may be of any length suitable for use as a primer, e.g. about 8-50 nucleotides, e.g. about 8-45, 8-40, 8-35, 8-30, 8-25, 8-20, 8-15, 8-14, 8-13, 8-12, 8-11, 8-10, 9-45, 9-40, 9-35, 9-30, 9-25, 9-20, 9-15, 9-14, 9-13, 9-12, 9-11, 10-45, 10-40, 10-35, 10-30, 10-25, 10-20, 10-15, 10-14, 10-13, 10-12 nucleotides, such as about 8, 9, 10, 11, 12, 13, 14, 15, 16, 17, 18, 19, 20 nucleotides.

PCR amplification is a well-known method in the art. A person skilled in the art can determine appropriate amplification steps and conditions according to the sequence to be amplified and the primer sequence.

In vitro transcription is a well-known method in the art. A person skilled in the art can determine appropriate transcription steps and conditions according to the sequence to be transcribed.

In a fifth aspect, the present invention provides a method for improving the efficiency of sgRNA-mediated gene editing, comprising: adding a ribonucleotide sequence rich in adenine ribonucleotide (A) at 3' end of the sgRNA, wherein the sgRNA and the ribonucleotide sequence rich in adenine ribonucleotide (A) are as described above.

Various methods for adding a ribonucleotide sequence to 3' end of a sgRNA are known in the art, including chemical synthesis, recombination methods, etc. In one embodiment, a desired ribonucleotide sequence is added to 3' end of sgRNA is achieved by means of PCR amplification.

In a sixth aspect, the present invention provides a kit, comprising:
  a template primer nucleic acid, comprising a nucleic acid sequence encoding a CRISPR effector protein binding moiety; and
  a first primer and a second primer, wherein the first primer, from 5' to 3' direction, comprises a sequence complementary to the sequence of SEQ ID NO: 13, 20, or 21, and a sequence complementary to a partial sequence at 3' end of the template primer nucleic acid; and the second primer, from 5' to 3' direction, comprises a nucleotide sequence corresponding to a ribonucleotide sequence specifically targeting a target DNA sequence, and a partial sequence at 5' end of the template primer nucleic acid.

In one embodiment, the template primer nucleic acid comprises a polynucleotide having the sequence of SEQ ID NO: 6.

In one embodiment, the first primer comprises a polynucleotide having the sequence of SEQ ID NO: 5.

In one embodiment, the kit may further include a second primer comprising, from 5' to 3' direction, a promoter sequence, a sequence encoding a ribonucleotide sequence specifically targeting a target DNA sequence, and a partial sequence corresponding to 5' end of the template primer nucleic acid. The promoter may any suitable promoter known in the art, such as those that can be used for in vitro transcription, e.g., a T7 promoter. In one embodiment, the promoter comprises a sequence of nucleotides 1-21 in SEQ ID NO: 4.

In one embodiment, the kit may also include appropriate reagents for in vitro transcription of DNA, such as RNA polymerases, and/or reagents for isolating and purifying RNA.

In one embodiment, the kit may also include a CRISPR effector protein described herein.

In one embodiment, the kit may be used to prepare the RNA in the first aspect or the nucleic acid in the second aspect of the present invention, or used for gene editing.

In a seventh aspect, the present invention provides a method of gene editing, comprising employing the RNA in the first aspect, the nucleic acid in the second aspect, or the construct in the third aspect, e.g., introducing it to target cells. Methods for introducing nucleic acids into target cells are well known in the art, including, but not limited to, electroporation.

In an eighth aspect, the present invention provides use of the RNA in the first aspect, the nucleic acid in the second aspect or the construct in the third aspect in gene editing.

The RNA in the first aspect of the present invention or the nucleic acid encoding the RNA may be used in gene editing. For example, the RNA of the present invention and the CRISPR effector protein such as a Cas9 protein form a complex, and then are in contact with target cells, thereby modifying a target DNA at the target DNA site, resulting in DNA cleavage, DNA methylation, DNA damage, DNA repair, etc.

As used herein, the target cell may be cells of any suitable subject for gene editing, such as but not limited to cells of bacteria, archaea, plants, algae, fungi (e.g. yeasts), animals such as non-human mammals e.g. rodents and human.

The engineered sgRNA as described in the present invention can improve genome editing efficiency and target specificity, regulate biological toxicity and editing flexibility, achieve more specific, efficient and safer gene editing, and ultimately improve the clinical benefits of gene therapy.

Unless otherwise indicated in the context, the term "or" herein is intended to encompass "and".

The term "optional" or "optionally" means that an event or situation described following it may or may not occur, including the occurrence of the event or situation and the non-occurrence of the event or situation. For example, a step following the term "optionally" means that the step exists or does not exist.

As described herein, the term "about" refers to a range of values that include specific values that a person skilled in the art can reasonably consider to be similar to the specific values. In some embodiments, the term "about" refers to being within standard errors using measurements generally accepted in the art. In some embodiments, the term "about" refers to +10, 5, 4, 3, 2, ±1 or even ±0.5 of specific values.

As used herein, when specific values or proportions are listed for a feature in the specification, a range of any two values or proportions is also encompassed. For example, when the values 1, 2, 3, and 4 are listed, 1-2, 1-3, 1-4, 2-3, 2-4, 3-4, etc. are also encompassed.

Although various embodiments and aspects of the present invention are shown and described herein, it is obvious for a person skilled in the art to understand that these embodiments and aspects are merely intended to illustrate the present invention. A person skilled in the art may make a variety of changes, alterations and substitutions within the scope of not deviating from the spirit of the present invention. It should be understood that various alternatives to the embodiments of the present invention described herein may be used in the implementation of the present invention.

EXAMPLES

The present invention is further illustrated below by the following non-limiting examples. It is known to those skilled in the art that many modifications may be made to the present invention without deviating from the spirit of the invention, and such modifications also fall within the scope of the present invention.

The following experimental methods are routine methods unless otherwise specified, and the experimental materials used can be easily obtained from commercial companies unless otherwise specified. Researchers in the art are familiar with PCR, enzyme digestion, ligation and other experiments involved in conventional plasmid construction, as well as transformation, bacterial culture and other experiments involved in protein expression, so details of the specific relevant experiments are not specified in detail. For details, please refer to conventional experimental conditions described in "Molecular Cloning: A Laboratory Manual" [J. Sambrook, etc. (Edition 3) [M], Science Press, 2002].

In addition to the specific methods, devices and materials used in the examples, the present invention may also be implemented by using any methods, devices and materials in the prior art that are similar or equivalent to those described in the examples according to the prior art known to a person skilled in the art and the disclosure of the present application.

Example 1: Preparation of sgRNA

Preparation method: a DNA template was rapidly prepared by overlap extension of polymerase chain reaction (PCR) and was purified by using a DNA purification kit, a large quantity of sgRNAs were prepared by means of in vitro transcription, and finally a large quantity of sgRNAs with high purity and integrity were obtained by purification (see FIG. 1).

1. PCR Assembly for In Vitro Transcription of DNA Template 1.1: Primers

| Primer name | Stock solution concentration (μM) | Dilution concentration (M) |
| --- | --- | --- |
| T7G-sgRNA | 100 | 90 μl of sterile water + 10 μl of primer stock solution = 10 μM |
| crRNA/tracrRNA | 100 | 90 μl of sterile water + 10 μl of primer stock solution = 10 μM |
| tracrRNA | 100 | 90 μl of sterile water + 10 μl of primer stock solution = 10 μM |

1.2: PCR reaction system: adding each reactant according to the following table, in a reaction system of 50 μl.

| Reactant name | | Concentration | Sampling volume (μl) |
| --- | --- | --- | --- |
| Primer 1 (SEQ ID NO: 4) | T7G-sgRNA | 10 μM | 2.5 |
| Primer 2 (SEQ ID NO: 6) | crRNA/tracrRNA | 10 μM | 0.1 |
| Primer 3 (SEQ ID NO: 5) | tracrRNA | 10 μM | 2.5 |

-continued

| Reactant name | | Concentration | Sampling volume (μl) |
| --- | --- | --- | --- |
| enzymes and buffers, etc | 2x Taq Plus Master Mix II (Dye Plus) (Brand: Vazyme, catalog number: P213-02) | 2× | 25 |
| Sterile water | DNase/RNase-free water | N/A | Up to 50 μl |

1.3: PCR Reaction procedures

| PCR process | Reaction temperature | Reaction time | Number of cycles |
| --- | --- | --- | --- |
| Pre-denaturatation | 95° C. | 3 min | 1 |
| Denaturation | 95° C. | 15 s | 30 cycles |
| Annealing | 60° C. | 20 s | |
| Extension | 72° C. | 10 s | |
| Thorough extension | 72° C. | 5 min | 1 |
| Incubation | 4° C. | ∞ | 1 |

2. PCR Product Purification (Common DNA Product Purification Kit, Brand: TIANGEN, Catalog Number: DP204)

This step was operated following instructions in the purification kit to purify and collect DNA solution and detect DNA concentration, wherein this DNA solution served as template DNA for subsequent in vitro transcription.

3. In Vitro Transcription of sgRNA (Brand: HZYMES BIOTECHNOLOGY CO. LTD.)

In vitro transcription of sgRNA: PCR reaction system configuration: adding each reactant according to the following table, in a reaction system of 20 μl.

| Reactant name | Volume (μl) |
| --- | --- |
| 10x transcription buffer (Mg$^{2+}$ Plus) (catalog number: HBP000331) | 20 |
| CTP (catalog number: HBP002102)/GTP (catalog number: HBP002002)/ATP (catalog number: HBP001902)/UTP (catalog number: HBP002201) (100 mM each) | 10 each |
| T7 RNA polymerase (250 U/μl) (catalog number: HBP000331) | 8 |
| Pyrophosphatase 0.1 U (catalog number: HBP000503) | 10 |
| RNase inhibitor (40 U/μl) (catalog number: HBP002201) | 10 |
| RNase-free water | 82 |
| Template DNA (i.e., PCR product of the previous step, 340 ng/μg) | 30 |

The reaction was performed at 37° C. for 4 h, and 2U DNaseI (RNase-free) (brand: HZYMES BIOTECHNOLOGY CO. LTD., catalog number: HBP000907) was added to remove DNA template at 37° C. for 30 min.

4. sgRNA Purification 4.1: 5M LiCl solution (brand: HZYMES BIOTECHNOLOGY CO. LTD., batch number: HH20221020) was added in a volume equal to that of the in vitro transcription (IVT) product, mixed well, and placed at −20° C. for at least 30 min.

4.2: Centrifugation was performed at 12,500 g, 4° C. for 15 min.

4.3: The supernatant was pipetted and discarded, and the RNA pellet was washed with pre-chilled 70% ethanol which was 10 times the volume of the sample, and centrifuged at 4° C. for 8 min.

4.4: The supernatant was pipetted and discarded, and the RNA pellet was washed with pre-chilled 70% ethanol which was 10 times the volume of the sample, and centrifuged at 4° C. for 8 min.

4.5: The RNA pellet was dissolved with an appropriate volume of RNase-free $H_2O$.
4.6: Detecting concentration.

Example 2: Extracellular Functional Validation of sgRNA

1. Cell Culture
   1.1: A UV lamp in a biosafety cabinet was turned on half an hour in advance for disinfection, the DMEM complete medium was placed in 37° C. water bath for pre-warming, and DPBS (brand: BBI, catalog number: E607009-0500) and Tryple (brand: Gibco, catalog number: A12859-01) were placed at room temperature.
   1.2: After disinfection, a cell culture dish was removed from a 5% $CO_2$ incubator, the supernatant in the cell culture dish was pipetted and discarded, the cell culture dish was added with 1 ml of DPBS and washed with gentle shaking, and the residual medium was removed.
   1.3: DPBS was pipetted and discarded; 1 ml of Tryple was added to the cell culture dish and set aside for 1 min; 2 ml of the DMEM complete medium was added; 293T cells at the bottom of the cell culture dish were gently blown off; and all the cells were pipetted and transferred into a 50 ml centrifuge tube, labeled as 293T, and mixed well with gentle blowing.
   1.4: The cell suspension was pipetted and added to a 1.5 ml EP tube for DNA extraction. If cell genome could not be extracted in time, the cell suspension was centrifuged at a speed of 300 g for 3 min, the supernatant was pipetted and discarded, and the cell pellet was placed at −20° C. for temporary storage.
2. Cell Genome Extraction (AxyPrep Genomic DNA Mini Kit, Brand: AXYGEN, Catalog Number: AP-MN-MS-GDNA-4 AP-MN-MS-GDNA-50)
   This step was carried out following instructions in the purification kit to purify and collect DNA, which was stored at −20° C. for subsequent PCR identification.
3. Amplification of Gene of Interest
   3.1: PCR verification was performed using Primer 1F/1R and cell genome.
   3.2: PCR reaction kit was Vazyme 2×Taq Plus Master Mix II (Dye Plus).
   3.3: Preparation of PCR reaction system:

| | |
|---|---|
| 2x Taq Plus Master Mix II (Dye Plus) | 10 μl |
| Primer 1F (SEQ ID NO: 7) (10 μM) | 1 μl |
| Primer 1R (SEQ ID NO: 8) (10 μM) | 1 μl |
| Template DNA | 1 μl |
| ddH$_2$O | 7 μl |

3.4: PCR reaction procedure was as follows:

| | |
|---|---|
| 95° C. | pre-denaturation for 5 min |
| 95° C. | denaturation for 15 s 30 cycles |
| 60° C. | annealing for 20 s |
| 72° C. | extension for 60 s |
| 72° C. | thorough extension for 5 min |
| 4° C. | storage |

Figure 2:
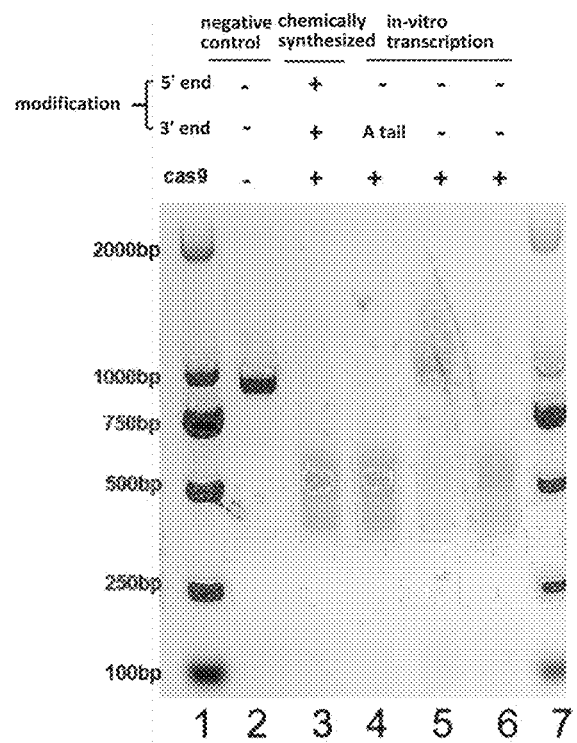
FIG. 2 shows that different types of sgRNAs guide a cas9 protein for in vitro cleavage of a DNA fragment. The DNA fragment has a size of approximately 926 bps, and fragments obtained after digestion have sizes of approximately 516 bps and 410 bps, respectively. Lanes 1 and 7 are DNA Markers; Lane 2 is a DNA fragment of interest; Lane 3 is in vitro cleaved DNA fragment of interest with cas9 protein guided by chemically synthesized sgRNA, wherein two ends of the sgRNA are subjected to 2'-O-methyl modification and phosphorothioate modification (SEQ ID NO: 3), respectively; Lane 4 is in vitro cleaved DNA fragment of interest with cas9 protein guided by sgRNA prepared by in vitro transcription, wherein the 3' end of the sgRNA is subjected to poly(A) tail modification; and Lanes 5 and 6 are in vitro cleaved DNA fragment of interest with cas9 protein guided by sgRNA prepared by in vitro transcription, wherein the sgRNA is not subjected to any modification.
Figure 3:
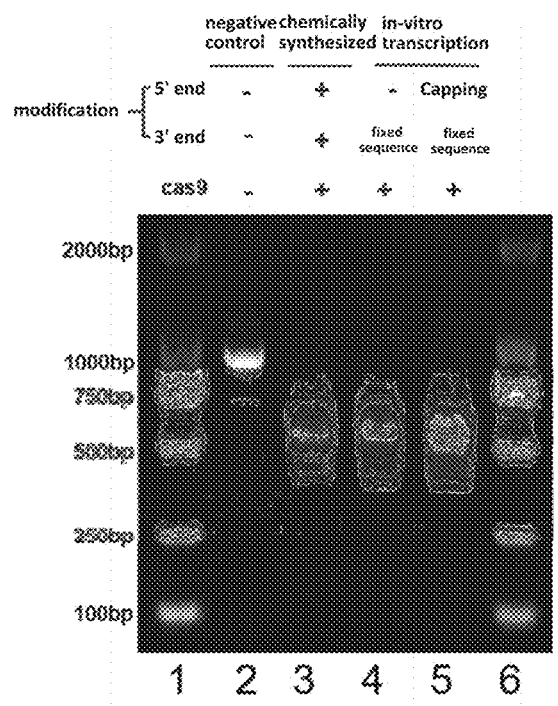
FIG. 3 shows that different types of sgRNAs guide a cas9 protein for in vitro cleavage of a DNA fragment. The DNA fragment has a size of approximately 900 bps, and fragments obtained after digestion have sizes of approximately 500+ bps and 400 bps, respectively. Lanes 1 and 6 are DNA Markers; Lane 2 is a DNA fragment of interest; Lane 3 is in vitro cleaved DNA fragment of interest by cas9 protein guided by chemically synthesized sgRNA, wherein two ends of the sgRNA are subjected to 2'-O-methyl modification and phosphorothioate modification (SEQ ID NO: 3), respectively; Lane 4 is in vitro cleaved DNA fragment of interest with cas9 protein guided by sgRNA prepared by in vitro transcription, wherein a fixed sequence (as shown in SEQ ID NO: 13) is added to the 3' end of the sgRNA; and Lane 5 is in vitro cleaved DNA fragment of interest with cas9 protein guided by the sgRNA prepared by in vitro transcription, wherein a fixed sequence (as shown in SEQ ID NO: 13) is added to the 3' end of the sgRNA, and the 5' end of the sgRNA is subjected to capping modification.

3.5: Agarose gel making: 0.3 g of agarose (brand: Sangon, catalog number: 9012-36-6) was weighed and added to 30 ml of TAE (1×) (brand: Sangon, catalog number: B548101-0500), dissolved by microwave heating, added with 3 μl of GelRed (brand: Biotium, catalog number: 41003), mixed well, poured into a gel plate, and waited for cooling and solidification.
   3.6: After PCR reaction, 5 μl of the PCR product was subjected to agarose gel electrophoresis to observe whether the size of the band meets the size of band of interest. If the size of the band was as expected, then the PCR product was to be purified.
4. Purification of Gene of Interest (Common DNA Product Purification Kit, Brand: TIANGEN, Catalog Number: DP204)
   This step was carried out following instructions in the purification kit to purify and collect DNA solution and detect DNA concentration.
5. In Vitro Digestion Function Verification
   5.1: Forming a complex of sgRNA and cas9 protein: taking a clean 200 μl PCR tube, adding therein ultra-pure water (up to 30 μl according to digestion volume), 10 μmol cas9 protein and 10 μmol gRNA, and mixing well. 3 μl of 10×buffer was added. RNP was formed after storage at room temperature for 10 min.
   5.2: 1 μmol of DNA was added and incubated at 37° C. for 25 min. After incubation, 0.5 μl of Rnase A was added, mixed well, added with 3 μl of Protein K, and incubated at 56° C. for 10 min, to digest Cas9 protein.
   5.3: Agarose gel making: 0.6 g of agarose was weighed and added to 60 ml of TAE (1×), dissolved by microwave heating, added with 6 μl of GelRed, mixed well, poured into a gel plate, and waited for cooling and solidification.
   5.4: The enzyme digestion product was taken to subject to agarose gel electrophoresis together with a negative control, 15 μl pipetted for electrophoresis.
6. Results
   As shown in FIGS. 2 and 3, the in vitro results showed that unengineered sgRNA (SEQ ID NO: 1, 101 nt), engineered sgRNA (SEQ ID NO: 2, 126 nt), and chemically synthesized base-modified sgRNA (SEQ ID NO: 3, 101 nt) were all effective in guiding the cleavage of the DNA of interest by the cas9 protein.

Example 3: iPSC Intracellular Functional Validation of sgRNA

1. Cell Culture
   1.1: An ultraviolet lamp in a biological safety cabinet was turned on half an hour in advance for disinfection, and Y27632 (brand: MCE, catalog number: HY-10583)+ncTarget complete medium (brand: Nuwacell Biotechnologies Co., Ltd., catalog number: RP01020), DPBS and EDTA passaging working solution (brand: Nuwacell Biotechnologies Co., Ltd., catalog number: RP01007) were placed at room temperature for preheating.
   1.2: After disinfection, a cell culture dish was removed from 5% $CO_2$ incubator, the supernatant in the cell culture dish was pipetted and discarded, the cell culture dish was added with 1 ml of DPBS and washed with gentle shaking, and the residual medium was removed.
   1.3: DPBS was pipetted and discarded; 1 ml of EDTA passaging working solution was added to the cell culture dish, set aside for 5-8 min, and then pipetted and discarded; 2 ml of Y27632+ncTarget complete medium was added; iPSCs cells at the bottom of the cell culture dish were gently blown off; all the cells were pipetted and transferred to a 50 ml centrifuge tube, labeled as iPSCs, and mixed well with gentle blowing, and centrifuged at a speed of 300 g for 3 min; and the supernatant was pipetted and discarded, and the cells were stored for later use.

2. Cell Electroporation
   2.1: iPSCs were prepared into a cell suspension, which could be slightly blown as much as possible into single cells, and counted with a counter. (iPSCs could be replaced with TrypLE digested cells, attention to the digestion time, 1-2 min is enough)
   2.2: An electroporation buffer A (Celetrix) and buffer B (Celetrix) were mixed at the ratio of 1:1 in advance and labeled as buffer C for later use.
   2.3: 1-1.5 µg of Cas9 protein, 1-1.5 µg of sgRNA, 2 µg of donor DNA, and 10 µL of buffer C were added to a 1.5 mL EP tube and incubated at room temperature for 10-15 min.
   2.4: 1-1.5×$10^6$ viable cells were harvested, and centrifuged at 200 g for 3 min to collect the cells.
   2.5: The cell pellet in step 2.4 was resuspended with 10 µL of buffer C.
   2.6: The solutions in steps 2.3 and 2.5 were gently mixed and incubated at room temperature for 10 min.
   2.7: According to instructions of the Celetrix electroporation instrument, the cells were subjected to electroporation, for iPSC cells 540V was used.
   2.8: After electroporation, the cells were gently transferred to a culture plate containing pre-warmed Y27632+ncTarget complete medium.
   2.9: The cells were shaken horizontally in a crossed manner at 37° C. in 5% $CO_2$ incubator, then shake horizontally in a crossed manner again, and incubated overnight. New ncTarget complete medium was exchanged after 18-24 h and the solution was exchanged daily thereafter.

3. Cell Genome Extraction (AxyPrep Genomic DNA Mini Kit, Brand: AXYGEN, Catalog Number: AP-MN-MS-GDNA-4 AP-MN-MS-GDNA-50)

This step was carried out following instructions in the purification kit to purify and collect DNA, which was stored at −20° C. for subsequent identification of homologous recombination efficiency.

4. Identification of Successful Homologous Recombination by Amplification of Gene of Interest
   4.1: PCR verification was carried out using primers on both sides of a homologous arm and cell genome after homologous recombination.
   4.2: PCR reaction kit was Vazyme 2×Taq Plus Master Mix II (Dye Plus).
   4.3: Preparation of PCR reaction system of left homology arm:

| | |
|---|---|
| 2x Taq Plus Master Mix II (Dye Plus) | 10 µl |
| Primer 1F (SEQ ID NO: 9) (10 µM) | 1 µl |
| Primer 1R (SEQ ID NO: 10) (10 µM) | 1 µl |
| Template DNA | 1 µl |
| ddH$_2$O | 7 µl |

4.4: Preparation of PCR reaction system of right homology arm:

| | |
|---|---|
| 2x Taq Plus Master Mix II (Dye Plus) | 10 µl |
| Primer 1F (SEQ ID NO: 11) (10 µM) | 1 µl |
| Primer 1R (SEQ ID NO: 12) (10 µM) | 1 µl |
| Template DNA | 1 µl |
| ddH$_2$O | 7 µl |

4.5: PCR reaction procedures were as follows:

| | |
|---|---|
| 95° C. | pre-denaturation for 5 min |
| 95° C. | denaturation for 15 s 30 cycles |
| 60° C. | annealing for 20 s |
| 72° C. | extension for 60 s |
| 72° C. | thorough extension for 5 min |
| 4° C. | storage |

4.6: Agarose gel making: 0.3 g of agarose was weighed and added to 30 ml of TAE (1×), dissolved by microwave heating, added with 3 µl of GelRed, mixed well, poured into a gel plate, and waited for cooling and solidification.

4.7: After PCR reaction, 5 µl of the PCR product was subjected to agarose gel electrophoresis to observe whether the size of the band meets the size of band of interest. If the size of the band was as expected, then the PCR product was to be purified.

5. Results

Figure 4:
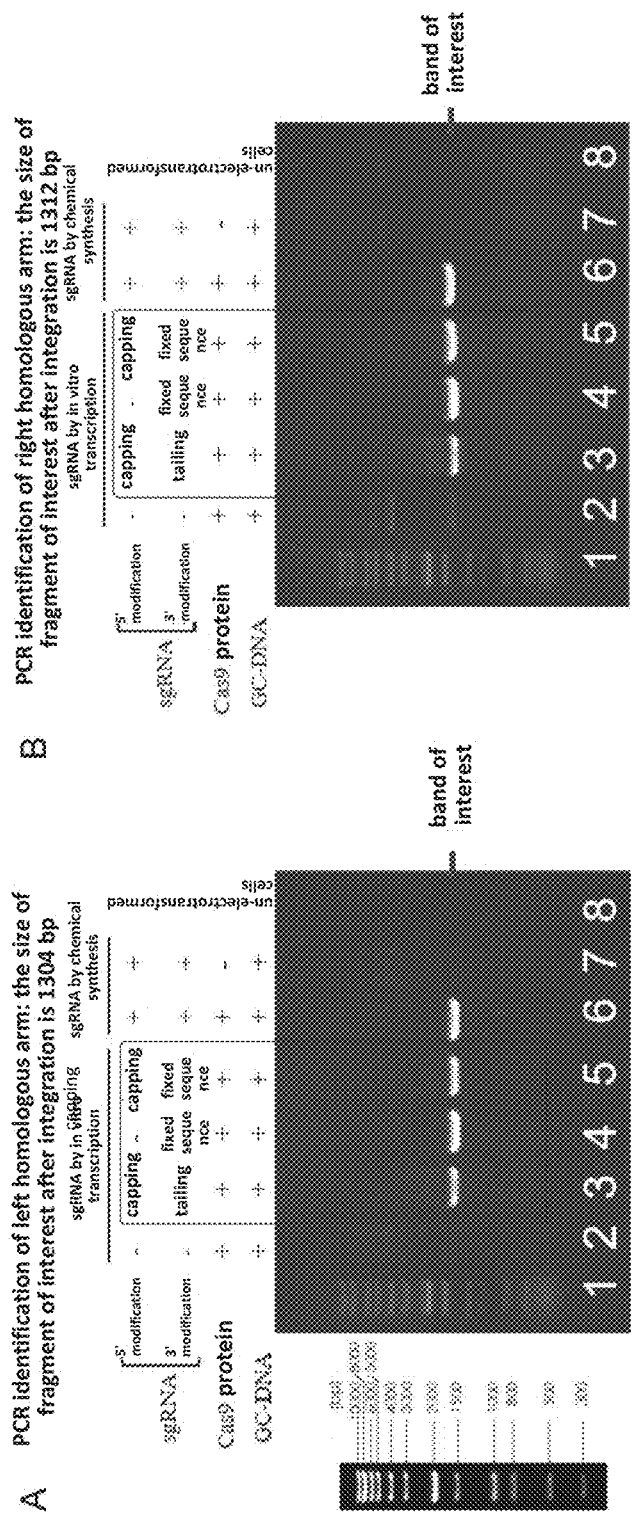
FIG. 4 shows the detection of homologous recombination of a sequence of interest after different types of sgRNAs guide the cas9 protein to perform intracellular gene editing. In this experiment, different types of sgRNAs are used at first to guide the cas9 protein to perform intracellular gene editing, and a DNA sequence of interest inserted into a genome is added at the same time; the purpose of inserting the DNA sequence of interest into the genome is achieved through homologous recombination repair; cells are then cultured for 72 h, and cell genomes are extracted; and finally, whether homologous recombination occurs in the cells is determined by whether a sequence integrated into the genome can be amplified. Amplification primers are located at two ends of the left homology arm and the right homology arm, respectively. It is verified that a forward primer sequence (SEQ ID NO: 9) homologously recombined at the left homology arm is located in genome on the left side of the homology arm, and a reverse primer sequence (SEQ ID NO: 11) homologously recombined at the left homology arm is located in the inserted gene sequence; and it is verified that a forward primer sequence (SEQ ID NO: 12) homologously recombined at the right homology arm is located in genome on the right side of the homology arm, and a reverse primer sequence (SEQ ID NO: 10) homologously recombined at the right homology arm is located in the inserted gene sequence.

The in vitro gene editing results showed that unengineered sgRNA (SEQ ID NO: 1), engineered sgRNA (SEQ ID NO: 2), and chemically synthesized base-modified sgRNA (SEQ ID NO: 3) were all effective in guiding the cleavage of the DNA of interest by cas9 protein (FIG. 2, FIG. 3);

The in-vivo homologous recombination results showed that compared with unengineered sgRNA, engineered sgRNAs (modified with a capping enzyme and a poly(A) polymerase, modified with a fixed sequence, or modified with a capping enzyme and a fixed sequence; or chemically synthesized base-modified) can all efficiently guide a DNA template for homologous recombination (FIG. 4A, comparison results of Lanes 3, 4, 5 and 6 to Lane 2; FIG. 4B, comparison results of Lanes 3, 4, 5 and 6 to Lane 2); and compared with other engineered sgRNAs (modified with a capping enzyme and a poly(A) polymerase, or modified with a capping enzyme and a fixed sequence; or chemically synthesized base-modified), sgRNA in which a sequence was added to 3' end showed the same effect to guide a DNA template for homologous recombination (FIG. 4A, comparison results of Lanes 3, 5 and 6 to Lane 4; FIG. 4B, comparison results of Lanes 3, 5 and 6 to Lane 4).

Therefore, compared with sgRNAs engineered by other methods, sgRNA modified with a fixed sequence at 3' end had obvious advantages such as low cost, simple process, and easy large-scale production, which guarantees and supports novel gene editing therapies.

Example 4: Effect of the Length of the Sequence Added to 3' End on the Intracellular Function of sgRNA 1. Cell Culture
   1.1: An adherent-cultured 293T cell line (293T-GL) with stable overexpression of NeonGreen-teLuciferase expression element (Zhang Y, Hu J, Yu M, Wang Z, Qing H, Fu H, Yuan L, Li F, Zhao S*. A novel BRET based genetic coded biosensor for apoptosis detection at deep tissue level in live animal. Apoptosis. 2021 December; 26(11-12):628-638. doi: 10.1007/s10495-021-01693-x. Epub 2021 Nov. 8.) could express the green fluorescent protein and teLuciferase.

1.3: DPBS was pipetted and discarded; 1 ml of Tryple was added to the cell culture dish and set aside for 1 min; 2 ml of DMEM complete medium was added; 293T cells at the bottom of the cell culture dish were gently blown off; and all the cells were pipetted and transferred to a 50 ml centrifuge tube, labeled as 293T, mixed well with gentle blowing, centrifuged at a speed of 300 g for 3 min; and the supernatant was pipetted and discarded, and the cells were stored for later use.

2. Cell Electroporation 2.1: 293T-GL was prepared into a cell suspension, which could be slightly blown as much as possible into single cells, counted with a counter (could be replaced with TrypLE digested cells, attention to the digestion time, 1-2 min is enough).

2.2: The electroporation buffer A (Celetrix) and buffer B (Celetrix) were mixed at the ratio of 1:1 in advance and labeled as buffer C for later use.

2.3: 1-1.5 µg of Cas9 protein, 1-1.5 µg of sgRNAs with sequences in different lengths added at 3' end targeting the NeonGreen coding region: NGO-sgRNA, SEQ ID NO: 14; NG5-sgRNA, SEQ ID NO:15; NG10-sgRNA, SEQ ID NO: 16; NG15-sgRNA, SEQ ID NO: 17; NG20-sgRNA, SEQ ID NO: 18; or NG25-sgRNA, SEQ ID NO:19 (the lengths of the sequences added to 3' end in these sgRNAs were 0, 5, 10, 15, 20 and 25 nucleotide residues, respectively), 2 µg of donor DNA, and 10 µL of buffer C were added to a 1.5 mL EP tube and incubated at room temperature for 10-15 min.

2.4: 1-1.5×10$^6$ viable cells were harvested and centrifuged at 200 g for 3 min to collect the cells.

2.5: The cell pellet in step 2.4 was resuspended with 10 µL of buffer C.

2.6: The solutions in steps 2.3 and 2.5 were gently mixed and incubated at room temperature for 10 min.

2.7: According to instructions of the Celetrix electroporation instrument, the cells are electro-transformed at 540V.

2.8: After electroporation, the cells were gently transferred to a culture plate containing pre-warmed DMEM complete medium.

2.9: The cells were shaken horizontally in a crossed manner at 37° C. in 5% $CO_2$ incubator, then shaken horizontally in a crossed manner again, and incubated overnight. New DMEM complete medium was exchanged after 18-24 h and the solution was exchanged daily thereafter.

3. Luciferase Activity Assay

After one week of electroporation, the cells were digested, 3 duplicates (5×10$^4$ cells) of each sample were placed into a 96-well plate; 10 µl of 10% tritonX100 was added to each well for lysing at room temperature for 5 min; and a luciferase substrate: Diphenylterazine (DTZ, in a final concentration of 30 µM) was added under a luciferase microplate reader for quantitative determination of luciferase activity. After shaking for 5 seconds and mixing well, the luminous intensity was detected.

4. Results

Figure 5:
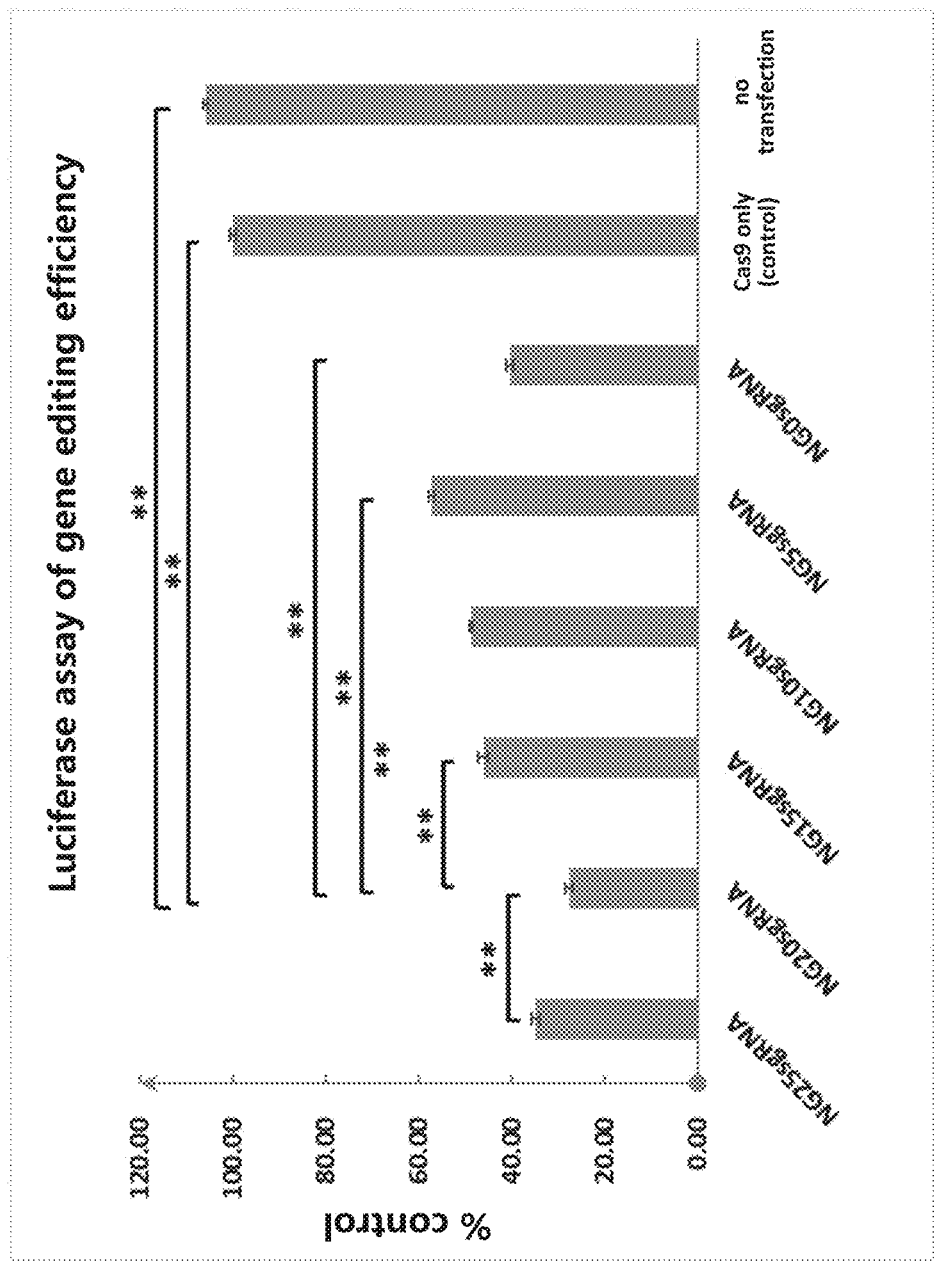
FIG. 5 shows the optimization of the sequence length added at 3' end of sgRNAs. After successful gene editing, a NeonGreen-teLuciferase expression element in a stable strain cell 293T-GL that expresses NeonGreen-teLuciferase originally is edited and replaced, and luciferase is no longer expressed, and previously expressed luciferase is gradually decreased to a background level within one week. Therefore, the relative efficiency of gene editing mediated by different sgRNAs (SEQ ID NOs: 14-19) can be compared by detecting the residual luciferase activity after one week of gene editing. The results in FIG. 5 show that sgRNAs with more than 20 ribonucleotides added at the 3' end are more effective, with NG20-sgRNA working best. (**, $p<0.01$)

After successful gene editing, the NeonGreen-teLuciferase expression element in the stable strain cell 293T-GL that can express NeonGreen-teLuciferase originally was replaced after editing, and luciferase was no longer expressed, and previously expressed luciferase was gradually decreased to the background level within one week. Therefore, the relative efficiency of gene editing mediated by different sgRNAs could be compared by detecting the residual luciferase activity after one week of gene editing. The results in FIG. 5 showed that the sequence added at 3' end was more effective in the case of 20/25 ribonucleotide residues than those in shorter, with NG20-sgRNA working best.

Sequence listing

| Name | Sequences | SEQ ID NO |
|---|---|---|
| IVT-sgRNA sequence (not engineered) | 5-GCUUGACGCAUCGCGCCAGGAGUUUUAGAGCUAGAAAU AGCAAGUUAAAAUAAGGCUAGUCCGUUAUCAACUUGAA AAAGUGGCACCGAGUCGGUGCUUUU-3 | 1 |
| IVT-sgRNA sequence (engineered) | 5-GCUUGACGCAUCGCGCCAGGAGUUUUAGAGCUAGAAAU AGCAAGUUAAAAUAAGGCUAGUCCGUUAUCAACUUGAA AAAGUGGCACCGAGUCGGUGCUUUU AUACAACAAAAACAAAAACAAGAAA-3 | 2 |
| Chemically synthesized sgRNA sequence (base-modified) | 5-mG*mC*mU*UGACGCAUCGCGCCAGGAGUUUUAGAGC UAGAAAUAGCAAGUUAAAAUAAGGCUAGUCCGUUAUCA ACUUGAAAAAGUGGCACCGAGUCGGUGCUmU*mU*mU*-3 (m represents 2'-methylation, represents phosphothionate) | 3 |
| Upstream primer sequence | 5-CTCttaatacgactcactataGCTTGACGCATCGCGCCAGGAGTT TTAGAGCTAGAAATAG-3 | 4 |
| Downstream primer sequence | 5-TTTCTTGTTTTTGTTTTTGTTGTAT AAAAGCACCGACTCGGTGCCACTTTTTCAAGTTG-3 | 5 |
| Fixed template primer sequence | 5-AAAAGCACCGACTCGGTGCCACTTTTTCAAGTTGATAACGG ACTAGCCTTATTTTAACTTGCTATTTCTAGCTCTAAAAC-3 | 6 |

Sequence listing

| Name | Sequences | SEQ ID NO |
|---|---|---|
| PCR primers for the gene of interest (forward) | 5-GCGGAAACCGCAGAAAAAAGT-3 | 7 |
| PCR primers for the gene of interest (reverse) | 5-TGTAACCAGCCACGGAACTC-3 | 8 |
| Primers of left homology arm to verify homologous recombination (forward) | 5-TGGGTGATTACCATGTGCCAG-3 | 9 |
| Primers of left homology arm to verify homologous recombination (reverse) | 5-GTAGTACACGGCGCTGTCTTC-3 | 10 |
| Primers of right homology arm to verify homologous recombination (forward) | 5-ATCAGCACAAGCACCGTGCTG-3 | 11 |
| Primers of right homology arm to verify homologous recombination (reverse) | 5-GCGAGGCCTGGGAATCAAATC-3 | 12 |
| RNA sequence for 3' tail in sgRNA | AUACAACAAAAACAAAAACAAGAAA | 13 |
| NG0-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUU | 14 |
| NG5-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUUAACAA | 15 |
| NG10-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUUACAAAAACAA | 16 |
| NG15-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUUAGAUAACAAAAACAA | 17 |
| NG20-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUUAACAAAGAUAACAAAAACAA | 18 |
| NG25-sgRNA | GGCACCGGCAAUCCCAACGAGUUUUAGAGCUAGAAAUAGCAAGUUAAAAUAAGGCUAGUCCGUUAUCAACUUGAAAAAGUGGCACCGAGUCGGUGCUUUUACAAAAACAAAGAUAACAAAAACAA | 19 |
| RNA sequence in 3' tail of NG20-sgRNA | AACAAAGAUAACAAAAACAA | 20 |

Sequence listing

| Name | Sequences | SEQ ID NO |
|---|---|---|
| RNA sequence in 3' tail of NG25-sgRNA | ACAAAAACAAAGAUAACAAAAACAA | 21 |

The invention claimed is:

1. A DNA-targeting RNA, from 5' to 3' direction, comprising:
   (i) a single-guide RNA (sgRNA); and
   (ii) a ribonucleotide sequence rich in adenine ribonucleotide (A) comprising at least 20 ribonucleotides in length, wherein the ribonucleotide sequence is selected from the group consisting of the nucleotide sequences of SEQ ID NOs: 13, 20 and 21.

2. The DNA-targeting RNA of claim 1, wherein, the sgRNA from 5' to 3' direction, comprises:
   a ribonucleotide sequence specifically targeting a DNA sequence, comprising 18-25 ribonucleotides in length; and
   a CRISPR effector protein binding moiety,
   wherein the CRISPR effector protein is selected from the group consisting of Cas3, Cas8a, Cas5, Cas8b, Cas8c, Cas10d, Cse1, Cse2, Csy1, Csy2, Csy3, GSU0054, Cas10, Csm2, Cmr5, Cas10, Csx11, Csx10, Csf1, Cas9, Csn2, Cas4, Cpf1, C2c1, C2c3 or C2c2 proteins, and functional variants thereof.

3. The DNA-targeting RNA of claim 2, wherein the ribonucleotide sequence specifically targeting a DNA sequence is 100% complementary to a target sequence in the DNA.

4. The DNA-targeting RNA of claim 1, wherein the DNA is present within a unicellular eukaryote, a plant cell, an invertebrate cell, or a vertebrate cell.

5. An isolated nucleic acid comprising a nucleotide sequence that encodes the DNA-targeting RNA of claim 1.

6. The nucleic acid of claim 5, comprising a polynucleotide encoding a promoter, the sgRNA and the ribonucleotide sequence rich in adenine ribonucleotide.

7. The nucleic acid of claim 6, wherein the promoter is a T7 promoter.

8. The nucleic acid of claim 7, wherein the T7 promoter comprises the sequence of nucleotides 1-21 of SEQ ID NO: 4.

9. The isolated nucleic acid of claim 5, wherein the isolated nucleic acid further comprises a promoter operably linked to the nucleotide sequence.

10. An expression vector comprising the nucleic acid of claim 5.

11. A method for preparing the DNA-targeting RNA of claim 1, comprising: (a) providing a nucleic acid that encodes the DNA-targeting RNA; and (b) performing in vitro transcription on the nucleic acid to produce RNA; and (c) isolating and purifying the produced RNA.

12. The method of claim 11, wherein the nucleic acid is obtained by PCR amplification and wherein step (a) further comprises:
(i) providing a template primer nucleic acid that encodes a CRISPR effector protein binding moiety;
(ii) providing an upstream primer and a downstream primer, wherein the downstream primer, from 5' to 3' direction, comprises a sequence complementary to the ribonucleotide sequence of SEQ ID NO: 13, 20 or 21, and a sequence complementary to partial sequence at 3' end of the template primer nucleic acid; and the upstream primer, from 5' to 3' direction, comprises a nucleotide sequence corresponding to a ribonucleotide sequence specifically targeting a target DNA sequence, and partial sequence at 5' end of the template primer nucleic acid; and
(iii) performing PCR amplification to obtain a template nucleic acid.

13. The method of claim 12, wherein the template primer nucleic acid comprises the DNA sequence of SEQ ID NO: 6.

14. The method of claim 12, wherein the downstream promoter comprises the DNA sequence of SEQ ID NO: 5.

15. A method for improving the efficiency of sgRNA-mediated gene editing, comprising: adding a ribonucleotide sequence rich in adenine ribonucleotide (A) at 3' end of the sgRNA, the ribonucleotide sequence having at least 20 ribonucleotides in length, wherein the ribonucleotide sequence is selected from the group consisting of the nucleotide sequences of SEQ ID NOs: 13, 20 and 21.

16. The method of claim 15, wherein the sgRNA, from 5' to 3' direction, comprises:
a ribonucleotide sequence specifically targeting a DNA sequence; and
a CRISPR effector protein binding moiety.

17. A method of gene editing, comprising introducing the DNA-targeting RNA of claim 1, and a CRISPR effector protein, into a target cell.

* * * * *